United States Patent
Kanzaki et al.

(10) Patent No.: US 8,241,439 B2
(45) Date of Patent: Aug. 14, 2012

(54) NI-CR ALLOY MATERIAL

(75) Inventors: Manabu Kanzaki, Amagasaki (JP);
Mitsuharu Yonemura, Takarazuka (JP);
Masanari Kimoto, Kobe (JP); Shoji Kinomura, Takarazuka (JP); Toshihiro Imoto, Kobe (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/945,978

(22) Filed: Nov. 15, 2010

(65) Prior Publication Data

US 2011/0056590 A1    Mar. 10, 2011

Related U.S. Application Data

(63) Continuation of application No. PCT/JP2009/058848, filed on May 12, 2009.

(30) Foreign Application Priority Data

May 16, 2008  (JP) ................................. 2008-129436

(51) Int. Cl.
*C22C 19/05*    (2006.01)
(52) U.S. Cl. ......................................... 148/428; 420/442
(58) Field of Classification Search .................. 148/676, 148/428
See application file for complete search history.

(56) References Cited

U.S. PATENT DOCUMENTS 4,909,860 A * 3/1990 England et al. ............... 148/677
6,482,528 B2 * 11/2002 Anada et al. .................. 428/472

FOREIGN PATENT DOCUMENTS

| JP | 58-64364 | 4/1983 |
|----|----------|--------|
| JP | 58-177443 | 10/1983 |
| JP | 61-227148 | 10/1986 |
| JP | 64-55366 | 3/1989 |
| JP | 3-100148 | 4/1991 |
| JP | 5-140707 | 6/1993 |
| JP | 8-29571 | 2/1996 |
| JP | 2002-121630 | 4/2002 |
| JP | 2002-322553 | 11/2002 |
| JP | 2006-111902 | 4/2006 |

OTHER PUBLICATIONS

English Abstract and English Machine Translation of Urayama et al. (JP 05-140707) (1993).*

* cited by examiner

*Primary Examiner* — Jessee R. Roe
(74) *Attorney, Agent, or Firm* — Clark & Brody

(57) ABSTRACT

A Ni—Cr alloy tube demonstrating an excellent corrosion resistance in a high temperature water environment can be provided,
wherein the difference between uniform lattice strains of the surface layer thereof satisfies the following formulas (1) and (2).

$$S \leq 0.002 \qquad (1)$$

$$S = D_{500} - D_{\leq 200} \qquad (2)$$

wherein the meanings of the individual symbols in the above described formulas are as follows:
S: The difference between uniform lattice strains (Å) of the surface layer
$D_{500}$: The {111} interplanar spacing (Å) at a depth of 500 nm from the material surface
$D_{\leq 200}$: The average value of the {111} interplanar spacings (Å) at the depth of 200 nm or less from the material surface.

2 Claims, No Drawings

NI-CR ALLOY MATERIAL

The disclosure of International Application No. PCT/JP2009/058848 filed May 12, 2009 including specification, drawings and claims is incorporated herein by reference in its entirety.

TECHNICAL FIELD

The present invention relates to a Ni—Cr alloy material, in particular, a Ni—Cr alloy material excellent in the general corrosion resistance in a high temperature water environment such as in a nuclear power plant.

BACKGROUND ART

Ni—Cr alloys such as Alloy600 and Alloy690 are employed for steam generator (SG) tubes for use in nuclear power plants. This is because these alloys have excellent corrosion resistance in a high temperature water environment. However, when even a trace amount of a metal component is released due to corrosion and is radioactivated in a plant, such a radioactivated metal component functions as a radiation source. Therefore further improvement of the corrosion resistance is desired.

Conventional arts to form a protective oxide film on the surface of a heat transfer tube aiming at suppression of the exposure to radiation have been proposed. For example, Patent Document 1 discloses a method in which a Ni-based alloy tube is heat treated at a pressure of $10^{-2}$ to $10^{-4}$ Torr and at a temperature of 400 to 750° C. in order to form an oxide film mainly composed of chromium oxide. According to this method, the general corrosion resistance is improved.

Patent Document 2 discloses a method for producing a member for a nuclear power plant in which method a Ni-based precipitation strengthened alloy is solution heat treated, and then heat treated in an oxidizing atmosphere of $10^{-3}$ Torr to atmospheric pressure for the purpose of an age hardening treatment and an oxide film formation treatment where one treatment combine at least a part of another treatment. Additionally, Patent Document 3 discloses a method for producing a Ni-based alloy product in which method the Ni-based alloy product is heat treated in an atmosphere of hydrogen or a mixed gas of hydrogen and argon with the dew point of −60 to +20° C.

Patent Document 4 discloses a method for forming a chromium enriched layer by exposing an alloy workpiece containing Ni and Cr to a gas mixture composed of water vapor and at least one nonoxidizing gas. Additionally, Patent Document 5 discloses a method for producing a Ni-based alloy in which method a Ni-based alloy is heated in an atmosphere containing carbon dioxide gas to form an oxide film composed of chromium oxide on the surface of the Ni-based alloy.
Citation List
Patent Document
  Patent Document 1: JP64-55366A
  Patent Document 2: JP8-29571A
  Patent Document 3: JP2002-121630A
  Patent Document 4: JP2002-322553A
  Patent Document 5: JP2006-111902A

SUMMARY OF INVENTION

Technical Problem

Any one of the conventional arts for forming a protective film on the surface of an alloy has an excellent prevention effect against metal release when the film is maintained in a sound state. However, the film could be exfoliated while the alloy is being used in a plant, to cause deterioration of the release property of the alloy and consequently to degrade the water quality in the plant.

The present invention was achieved in order to solve such problems of the conventional arts, and to provide a Ni—Cr alloy material drastically improved in corrosion resistance.

Solution to Problem

The present inventors have investigated the effect of the material surface microstructure on the general corrosion with materials composed of the same metal components as in conventional materials, and consequently, have found that the corrosion resistance is drastically improved by imparting large uniform lattice strain to the extreme surface layer, to complete the present invention.

The present invention involves a Ni—Cr alloy material shown in the following (A) and (B).

(A) A Ni—Cr alloy tube wherein the difference between uniform lattice strains of the surface layer thereof satisfies the following formulas (1) and (2).

$$S \leq 0.002 \quad (1)$$

$$S = D_{500} - D_{\leq 200} \quad (2)$$

wherein the meanings of the individual symbols in the above-described formulas are as follows:
S: The difference between uniform lattice strains (Å) of the surface layer
$D_{500}$: The {111} interplanar spacing (Å) at the depth of 500 nm from the material surface
$D_{\leq 200}$: The average value of the {111} interplanar spacings (Å) at the depth of 200 nm or less from the material surface (B) The Ni—Cr alloy tube according to (A), having a chemical composition containing by mass C: 0.15% or less, Si: 1.00% or less, Mn: 2.0% or less, P: 0.030% or less, S: 0.030% or less, Cr: 10.0 to 45.0%, Fe: 15.0% or less, Ti: 0.5% or less and Al: 2.00% or less, wherein the balance consists of Ni and impurities.

The Ni—Cr alloy tube of (A) and (B) are preferably used, for example, as members for a nuclear power plant.

The impurities as referred to herein mean the substances that contaminate metal materials during the industrial manufacturing process, derived from the raw materials such as ores and scrap, and various other factors.

ADVANTAGEOUS EFFECTS OF INVENTION

According to the present invention, a Ni—Cr alloy material demonstrating an excellent corrosion resistance in a high temperature water environment is obtained. By using the alloy material the release of the metal components can be suppressed to reduce radiation exposure. Accordingly, the Ni—Cr alloy material is best suited for the members for a nuclear power plant, such as steam generator tubing; spacer springs, coil springs, finger springs and channel fasteners used in a high temperature water environment; and nozzle stubs for lids.

DESCRIPTION OF EMBODIMENTS

In the Ni—Cr alloy material according to the present invention, at least the extreme surface layer, specifically the layer at a depth of 200 nm or less from the material surface, is required to have a microstructure with a large uniform lattice strain.

As an index for a uniform lattice strain, the present inventors focused on the {111} interplanar spacing, namely, the distance between a {111} crystal lattice plane and an adjacent {111} crystal lattice plane. The larger this {111}interplanar spacing is, the larger the strain acting on the tensile side is, and the electrochemically higher the surface activity is to promote the anode reaction. When the {111} interplanar spacing of the surface is smaller as compared to that of the bulk, passivation is delayed to degrade the corrosion resistance. Therefore, it is conceivable that when the {111} interplanar spacing of the surface is closer to that of the bulk, the metal release immediately after being exposed to a corrosive environment is promoted to enhance the passivation, and hence the corrosion resistance is improved.

On the other hand, immediately after being exposed to a high temperature water environment, the microstructure of the extreme surface layer, specifically the layer at a depth of 200 nm or less from the material surface, is affected by a corrosive reaction. Therefore, it is important to control the microstructure of the extreme surface layer in order to improve the corrosion resistance of the Ni—Cr alloy material. However, the microstructure of the extreme surface layer of the Ni—Cr alloy material tends to be nonuniform as compared to that of the bulk, namely, the position sufficiently deep from the surface layer. This is due to the following reasons.

Specifically, during the production of the Ni—Cr alloy material, for example, a cold working is performed after annealing to straighten the material deformation. The residual strain induced the cold working is not released in the bulk to produce a uniform lattice strain. On the other hand, the surface layer is a free surface, and hence the residual strain is readily released in the surface layer. The residual strain in the extreme surface layer can be further released by a subsequent heat treatment. Thus a uniform lattice strain in the extreme surface layer is usually smaller than that in the bulk.

Accordingly, it is effective to make a uniform lattice strain in the extreme surface layer close to that in the bulk, specifically at a depth of 500 nm from the surface layer. In other words, it is preferable to control the microstructure of the extreme surface layer so as for the difference between uniform lattice strains to satisfy the following formulas (1) and (2).

$$S \leq 0.002 \quad (1)$$

$$S = D_{500} - D_{\leq 200} \quad (2)$$

wherein the meanings of the individual symbols in the above described formulas are as follows:

S: The difference between uniform lattice strains (Å) of the surface layer $D_{500}$: The {111} interplanar spacing (Å) at a depth of 500 nm from the material surface $D_{\leq 200}$: The average value of the {111} interplanar spacings (Å) at the depth of 200 nm or less from the material surface The preferable lower limit of S is 0, and the preferable upper limit of S is 0.001.

Examples of the methods for imparting large uniform lattice strain include, but are not limited to, the methods to control the conditions of the straightening processing of a tube (for example, the offset amount, the wall thickness reduction rate and the like) and the conditions of the cold working (for example, the wall thickness reduction rate and the like). Additionally, the regulation both of the cold working conditions and the heat treatment conditions enables to impart large uniform lattice strain to the metal microstructure in the extreme surface layer.

The chemical composition of the Ni—Cr alloy material according to the present invention preferably contains, but is not limited to, the following elements within the indicated ranges, respectively. In the following description, the "%" for the content of each of the elements means "% by mass."

C: 0.15% or Less

C has an effect of enhancing the grain boundary strength of the alloy, and may be contained in the Ni—Cr alloy material according to the present invention. However, when the C content exceeds 0.15%, the stress corrosion cracking resistance would be degraded. Accordingly, when C is contained, the C content is preferably 0.15% or less and more preferably 0.06% or less. When the C content is 0.01% or more the effect of enhancing the grain boundary strength is remarkable.

Si: 1.00% or Less

Si is added as a deoxidizer during smelting, and remains in the alloy as an impurity. Because the excessive Si content would degrade the cleanliness of the alloy the Si content is preferably limited to 1.00% or less. The upper limit of the Si content is more preferably 0.50%. When the Si content is 0.05% or more the effect of the use of Si as a deoxidizer is remarkable.

Mn: 2.0% or Less

Mn is an effective element for the sake of fixing S as MnS and ensuring hot workability. However, because the excessive Mn content would lower the corrosion resistance of the alloy the Mn content is preferably limited to 2.0% or less. When the Mn content is 0.05% or more the above-described effect is remarkable.

P: 0.030% or Less

P is an element occurring as an impurity in the alloy. When the P content exceeds 0.030%, P would adversely affect the corrosion resistance. Accordingly, the P content is preferably limited to 0.030% or less.

S: 0.030% or Less

S is an element occurring as an impurity in the alloy. When the S content exceeds 0.030%, S would adversely affect the corrosion resistance. Accordingly, the S content is preferably limited to 0.030% or less.

Cr: 10.0 to 45.0%

Cr is an element effective for enhancing corrosion resistance. When the Cr content is 10.0% or more, the effect of the use of Cr is remarkable. On the other hand, when the Cr content exceeds 45.0%, the hot workability is remarkably deteriorated. Accordingly, when Cr is contained, the Cr content is preferably 10.0 to 45.0%. In particular, the alloy containing 14.0 to 17.0% of Cr shows the excellent corrosion resistance in a chloride-containing environment, and the alloy containing 27.0 to 31.0% of Cr additionally shows the excellent corrosion resistance in pure water or in an alkaline environment at high temperatures.

Fe: 15.0% or Less

Fe is an element that is solid-dissolved in Ni and is usable as a partial substitute for high-price Ni. Fe is preferably contained in the Ni—Cr alloy material according to the present invention. However, the excessive Fe content would impair the corrosion resistance of the Ni-based alloy. Accordingly, the Fe content is preferably limited to 15.0% or less. The Fe content is preferably 4.0% or more. The Fe content can be determined by the relationship between Ni and Cr, that is, the Fe content is preferably GM to 10.0% when the Cr content is 14.0 to 17.0%, and the Fe content is preferably 7.0 to 11.0% when the Cr content is 27.0 to 31.0%.

Ti: 0.5% or Less

Ti is an element that improves the workability of the alloy, and is effective in suppressing the grain growth during welding. However, when the Ti content exceeds 0.5%, the cleanliness of the alloy would be degraded. Accordingly, the Ti content is preferably 0.5% or less and more preferably 0.4% or less. When the Ti content is 0.1% or more the above-described effect is remarkable.

Al: 2.00% or Less

Al is added as a deoxidizer during steelmaking, and remains as an impurity in the alloy. The remaining Al would become an oxide-type inclusion in the alloy, to degrade the cleanliness of the alloy and to adversely affect the corrosion resistance and the mechanical properties of the alloy. Accordingly, the Al content is preferably limited to 2.00% or less. The lower limit of the Al content is preferably 0.05%.

The following two types of Ni-based alloy represent the above-described Ni-based alloy.

(a) A Ni-based alloy containing C: 0.15% or less, Si; 1.00% or less, Mn: 2.0% or less, P: 0.030% or less, S: 0.030% or less, Cr; 14.0 to 17.0%; Fe: 6.0 to 10.0%, Ti: 0.5% or less and Al: 2.00% or less, wherein the balance consists of Ni and impurities.

(b) A Ni-based alloy containing C: 0.06% or less, Si: 1.00% or less, Mn: 2.0% or less, P: 0.030% or less, S: 0.030% or less, Cr: 27.0 to 31.0%; Fe: 7.0 to 11.0%, Ti: 0.5% or less and Al: 2.00% or less, wherein the balance consists of Ni and impurities.

As the (a) alloy contains 14.0 to 17.0% of Cr and approximately 75% of Ni this alloy demonstrates the excellent corrosion resistance in a chloride-containing environment. The Fe content is preferably 6.0 to 10.0% by the relationship between the Ni and Cr contents in this alloy.

As the (b) alloy contains 27.0 to 31.0% of Cr and approximately 60% of Ni this alloy demonstrates the excellent corrosion resistance in pure water or in an alkaline environment at high temperatures in addition to in a chloride-containing environment. Likewise, the Fe content is preferably 7.0 to 11.0% by the relationship between the Ni and Cr contents in this alloy.

Examples of the methods for producing the Ni—Cr alloy material according to the present invention include, but are not limited to, a common production method such as a method in which a Ni—Cr alloy material having a predetermined chemical composition is melted to prepare an ingot, then the ingot is subjected to hot working-annealing steps or to hot working-cold working-annealing steps.

EXAMPLES

The alloy (Alloy690) having the chemical composition shown in Table 1 was melted in vacuum and cast into an ingot. The ingot was subjected to hot forging to make a billet. And the billet was formed into a tube shape by hot extrusion process. The tube was made to have an outer diameter of 25 mm and a wall thickness of 1.65 mm by cold rolling with a cold pilger mill. Then, the tube was annealed in a hydrogen atmosphere at 1100° C., and made to have an outer diameter of 19 mm, a wall thickness of 1 mm and a length of 18 m by cold drawing. Finally, the tube was annealed in a hydrogen atmosphere at 1100° C.

The produced tube was subjected to the following treatments. In Example 1 of the present invention, the tube was subjected to a cold working (offset: 8.5 mm, crush: 3.2 mm) with a straightener and then heat treated at 700° C. for 7 hours. In Example 2 of the present invention, the tube was subjected to a cold working (offset: 10.5 mm, crush: 3.7 mm) with a straightener and then heat treated at 725° C. for 10 hours. In Example 3 of the present invention, the tube was subjected to a cold working (offset: 8.5 mm, crush: 3.2 mm) with a straightener and then heat treated at 725° C. for 10 hours. In Comparative Example 1, the tube was subjected to a cold working (offset amount: 8.5 mm, crush amount: 2.8 mm) with a straightener and then heat treated at 725° C. for 10 hours.

From each of these tubes, a 30-mm long sample was taken, and the sample was cut parallel to the longitudinal direction into quarters to yield strip specimens. For each of the strip specimens, the {111} interplanar spacing $d_{111}$ of the surface layer of the inner surface of the tube was determined by grazing incidence X-ray diffraction with parallel beam optics (ULTIMA-III, manufactured by Rigaku Corp.) at a divergence longitudinal restriction slit of 2 mm and other slits opened. The sample was scanned at a scan speed of 0.5°/min with a sampling interval of 0.02°. The depth from the surface layer was calculated from the absorption coefficient of Ni. The interplanar spacing at the calculated depth was determined by adjusting the incidence angle of the X-ray, and thus $D_{\leq 200}$ (Å) and $D_{500}$ (Å) were obtained. The S (Å) values obtained by substituting the $D_{\leq 200}$ (Å) values and $D_{500}$ (Å) values into the above-described formula (2) are shown in Table 2.

Adopted as $D_{\leq 200}$ was the average value of the {111} interplanar spacings at the depths of 28 nm (incidence angle: 0.1°), 56 nm (incidence angle: 0.2°), 111 nm (incidence angle: 0.4°) and 167 nm (incidence angle: 0.6°), and adopted as $D_{500}$ was the {111} interplanar spacing at the depth of 500 nm (incidence angle: 1.8°).

A 2000-mm long sample was taken from each of the above-described heat treated tubes, and used for the release test. In the release test, by using a circulation autoclave, simulated primary water, namely, 1000 ppm B+2 ppm Li+30 cc $H_2$/kg $H_2O$ (STP) was flowed through the sample tube at 300° C. for 100 hours or more. After each of the elapsed times of about 20 hours (t1), about 50 hours (t2) and about 120 hours (t3), the solution flowed out from the tube was sampled for about one hour, and was filtered through ion exchange columns to collect the released Ni. The amount of Ni contained in each of the filters was measured by atomic absorption spectrometry. The amounts of Ni obtained respectively at the times of t1, t2 and t3 were respectively divided by the concerned sampling times to obtain the values a1, a2 and a3. The Ni release amount after 100 hours was obtained from "a1×t1+a2×(t2–t1)+a3×(100–t2)". The results are also shown in Table 2.

TABLE 1

| Chemical composition of the sample material (in mass %, balance: Ni and impurities) | | | | | | | | |
|---|---|---|---|---|---|---|---|---|
| C | Si | Mn | P | S | Cr | Fe | Ti | Al |
| 0.018 | 0.32 | 0.31 | 0.013 | 0.001 | 29.6 | 10.0 | 0.25 | 0.14 |

TABLE 2

| | The difference between uniform lattice strains S (Å) | Ni release amount (g/m²) |
|---|---|---|
| Example 1 of the present invention | 0.0007 | 1.6 × 10⁻⁴ |
| Example 2 of the present invention | 0.0008 | 8.5 × 10⁻⁴ |
| Example 3 of the present invention | 0.0015 | 9.3 × 10⁻⁴ |
| Comparative Example 1 | 0.0022 | 3.6 × 10⁻³ |

As shown in Table 2, in Comparative Example 1, the difference between uniform lattice strains S in the surface layer obtained from formula (2) is as high as 0.0022 Å and the Ni release amount was large. On the other hand, in each of Example 1 of the present invention in which the heat treatment was performed at a low temperature and for a short time and Examples 2 and 3 of the present invention in which a strong cold working was performed before the heat treatment, the difference between uniform lattice strains S in the surface layer was low and the Ni release amount was able to be reduced. In particular, in Example 1 of the present invention, the reduction effect of the Ni release amount was remarkable.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

According to the present invention, a Ni—Cr alloy material demonstrating an excellent corrosion resistance in a high temperature water environment is obtained, and hence by using the alloy material the release of the metal components can be suppressed to reduce radiation exposure. Accordingly, the Ni—Cr alloy material according to the present invention is suitable for the members for a nuclear power plant such as steam generator tubing; spacer springs, coil springs, finger springs and channel fasteners used in a high temperature water environment; and nozzle stubs for lids.

The invention claimed is:

1. The Ni—Cr alloy tube having a chemical composition consisting of by mass C: 0.15% or less, Si: 1.00% or less, Mn: 2.0% or less, P: 0.030% or less, Sulfur: 0.030% or less, Cr: 10.0 to 45.0%, Fe: 15.0% or less, Ti: 0.5% or less and Al: 2.00% or less, with the balance of Ni and impurities, wherein the difference between uniform lattice strains of the surface layer thereof satisfies the following formulas (1) and (2):

$$S \leq 0.002 \quad (1)$$

$$S = D_{500} - D_{\leq 200} \quad (2)$$

wherein the meanings of the individual symbols in the above described formulas are as follows;

S: the difference between uniform lattice strains (Å) of the surface layer, $D_{500}$: the {111} interplanar spacing (Å) at a depth of 500 nm from the material surface, and $D_{\leq 200}$: the average value of the {111} interplanar spacings (Å) at the depth of 200 nm or less from the material surface.

2. The Ni—Cr alloy tube according to claim 1, wherein the Ni—Cr alloy tube is used as a member for a nuclear power plant.

* * * * *